United States Patent [19]

Martin

[11] Patent Number: 4,660,101
[45] Date of Patent: Apr. 21, 1987

[54] APPARATUS AND METHOD FOR EDITING ELECTRONICALLY-DISPLAYED PICTURES

[75] Inventor: William A. Martin, Fairport, N.Y.

[73] Assignee: Eastman Kodak Company, Rochester, N.Y.

[21] Appl. No.: 644,098

[22] Filed: Aug. 24, 1984

[51] Int. Cl.$^4$ .............................................. H04N 5/781
[52] U.S. Cl. .................................... 358/342; 358/335; 360/35.1; 369/34
[58] Field of Search ............... 358/335, 342, 102, 906, 358/909, 93, 322; 360/35.1; 369/34; 365/234

[56] References Cited

U.S. PATENT DOCUMENTS

| | | | |
|---|---|---|---|
| 3,724,935 | 4/1973 | Batter | 352/38 |
| 3,748,381 | 7/1973 | Strobele et al. | 178/6.6 A |
| 4,000,510 | 12/1976 | Cheney et al. | 360/33 |
| 4,199,820 | 4/1980 | Ohtake et al. | 365/234 |
| 4,210,785 | 7/1980 | Huber et al. | 360/12 |
| 4,210,940 | 7/1980 | Prysby et al. | 360/33 |
| 4,224,644 | 9/1980 | Lewis | 360/72.2 |
| 4,270,150 | 5/1981 | Diermann et al. | 358/322 |
| 4,527,262 | 7/1985 | Manto | 369/34 X |
| 4,539,663 | 9/1985 | Ishibashi et al. | 369/34 |
| 4,567,515 | 1/1986 | Schumacher | 358/93 X |
| 4,608,679 | 8/1986 | Rudy et al. | 369/34 X |

FOREIGN PATENT DOCUMENTS

2337377 7/1977 France.
1370535 7/1972 United Kingdom.

OTHER PUBLICATIONS

Journal of the SMPTE, vol. 80, #8, Aug. 1971, pp. 605-613.
Journal of the SMPTE, vol. 86, #4.
"Electronic Still Camera", Kihara, N. et al, Journal of Applied Photographic Engineering, vol. 9, No. 5, Oct. 1983, 159-163.
"The Electronic Still Camera A New Concept in Photography", by Kihara, N. et al, IEEE Trans on Consumer Electronics, vol. CE-28, No. 3, Aug. 1982, 325-330.

*Primary Examiner*—Robert L. Richardson
*Attorney, Agent, or Firm*—David M. Woods

[57] ABSTRACT

In editing a collection of video still pictures prerecorded on a video disk, a composite picture is displayed showing a cropped part of each still picture and a message pertaining to the picture. The message suggests alternative decisions that may be made in relation to editing the picture. By temporarily substituting the missing part of the picture for the message, the user can obtain a better indication of image content before making a decision. The substitution is made by a two-state video switch having a first state in which it ordinarily passes a video picture signal obtained from the video disk and a video text signal corresponding to the message. The switch has a temporary second state in which it passes only the video picture signal. By pressing a button on a user-operated controller, the video switch is placed in its second state and only the video picture is displayed. Releasing the button redisplays the composite picture.

4 Claims, 3 Drawing Figures

APPARATUS AND METHOD FOR EDITING ELECTRONICALLY-DISPLAYED PICTURES

BACKGROUND OF THE INVENTION

1. Cross Reference to Related Applications

This application is related to (A) commonly assigned, copending patent application Serial No. 644,096, entitled "Video Disk Apparatus Providing Organized Picture Playback" and (B) commonly assigned, copending patent application Ser. No. 644,166, entitled "Method For Editing Video Still Pictures," both filed on even date herewith.

2. Field of the Invention

The invention pertains to apparatus and method for establishing an automatic, electronic display of a series of still pictures, especially still pictures prerecorded on one or more video disks.

3. Description Relative to the Prior Art

Video still imaging is a proposed form of imaging that offers the amateur photographer a convenient way of displaying a collection of still pictures. A typical video still camera uses a small magnetic disk as its memory device (see "Electronic Still Camera" by Kihara, N. et. al. *Journal of Applied Photographic Engineering*, Vol. 9, No. 5, Oct. 1983, 159–163). A companion player is envisioned which, when a recorded disk is inserted into it, converts the signals recorded on the disk into a television signal from which the display is generated. Each disk may store not only a number of still pictures but certain picture-related data representing display attributes such as the time allotted to viewing each picture, the order of viewing, titles and text. (Such picture-related data may be contained with each picture on the picture track or on one or more special tracks on the disk). Most video players will have a digital processor—usually a microcomputer—operated according to stored programs. The picture-related data is generated and stored by operation of the digital processor, usually after a number of pictures have been collected on the disk. In doing this, the pictures are edited one by one by specifying their display attributes, and the corresponding picture-related data is recorded on the disk. By processing the picture-related data from the disk, the player can subsequently provide customized, and automatic, viewing of pictures collected on the disk according to the specified display attributes.

Such a picture collection is relatively small. A video disk contains, for example, twenty-five full-frame pictures or fifty single-field pictures on concentric tracks. The specification of the display attributes is relatively manageable for such a small collection. However, being quite compact, video disks lend themselves to organized storage in groups. Accordingly, it is desirable to display them in multi-disk groups. In the case of a typical multi-disk player, a container of thirty disks is inserted into the player (which is adapted to remove a selected disk and display its pictures). For a thirty-disk container, this means that the player can access as many as 1500 pictures. With so many pictures, it is desirable to separate the pictures into categories of like image content, that is, into picture albums, and group the several albums into a video picture file.

Editing and organizing such a large collection of pictures into a video picture file becomes a complicated matter, particularly if each picture requires assignment of category and several display attributes. Since there are so many pictures, they can be grouped into many, say twenty or more, albums. Ordinarily, the assignment of category requires that the picture be displayed in combination with the choice of album assignments and certain other attributes, like a skip option for unsuitable pictures. The problem this causes is two-fold. The space allocated for twenty or more albums occupies a large part of the television screen and accordingly eliminates a large part of the picture. Seeing part of a picture is not always enough when the assignment of category depends on assessing the image content of the whole picture. Secondly, the remaining picture is sometimes rendered off-color because the automatic gain control circuit in the television receiver attempts to control the gain of the receiver amplifiers according to the average level of the received signal. Since the received signal is as much as half text, its average level is influenced by the signal level of the text. The remaining part of the display devoted to the picture is often adversely affected. Thus, even when the partial-picture observed is enough to make an assignment, its off-color rendition makes evaluation of its suitability for any album difficult.

SUMMARY OF THE INVENTION

A decision from partial data, that is, a part of the picture, is avoided by allowing the user a momentary, quickly reversible interruption of the editing process during which the whole picture is temporarily substituted for the picture partially obscured by text. Moreover, the level of the received signal is then wholly due to the picture and thus the picture is rendered in its correct color. The objective of the invention, therefore, is to promote accurate editing without jeopardizing the continuity of the editing process by momentarily displaying, at the direction of the user, the whole picture in its true color absent editing text.

Apparatus and method according to the invention pertain to a video player capable of reproducing a picture from a recording medium and playing back the picture in combination with text relating to the content of the picture. A video picture signal is generated from a picture prerecorded on the recording medium. A video text signal is also generated corresponding to a particular message of interest to the user. The message pertains to the picture and suggests one or more decisions that may be made in relation to the picture. The player has an output section that provides a signal suitable for displaying the picture with or without text. A two-state switching means has a first state in which the video picture signal and the video text signal are applied to the output section in order to display the picture including text. In a second state, the switch applies only the video picture signal to the output section to display the picture without text. The user has access to a controller which generates a viewing signal signifying the desire to see the picture without text. When the user initiates the viewing signal, means in the player places the switch in its second state thereby providing a display of the picture without text.

In the method according to the invention, a plurality of video pictures stored on a recording medium are arranged into a plurality of categories based on image content. Besides a video picture signal, a video text signal is generated corresponding to a list of categories to which the pictures may be assigned. A composite picture is displayed—formed from both signals—which shows a cropped part of the picture, a message specifying the list of categories, and a movable cursor for identifying a selected category. The remaining part of the picture is temporarily substituted for the text to obtain a better indication of image content before assigning the picture to a category. The composite picture is redisplayed and one of the categories is selected by using the movable cursor. Finally, the selected category is stored for later retrieval and use in connection with automatic viewing of the pictures.

BRIEF DESCRIPTION OF THE DRAWINGS

The invention will be described with reference to the FIGURES, wherein.

DETAILED DESCRIPTION OF THE PREFERRED EMBODIMENT

Because the art of magnetic recording and playback through a television receiver is well known in general, and specifically in connection with magnetic disks, the present description will for the most part be directed to elements forming part of, or cooperating more directly with, apparatus embodying the present invention. Elements not specifically shown or described, especially those pertaining to mechanical components and electrical circuits, may be selected from those known in the art.

Figure 1:
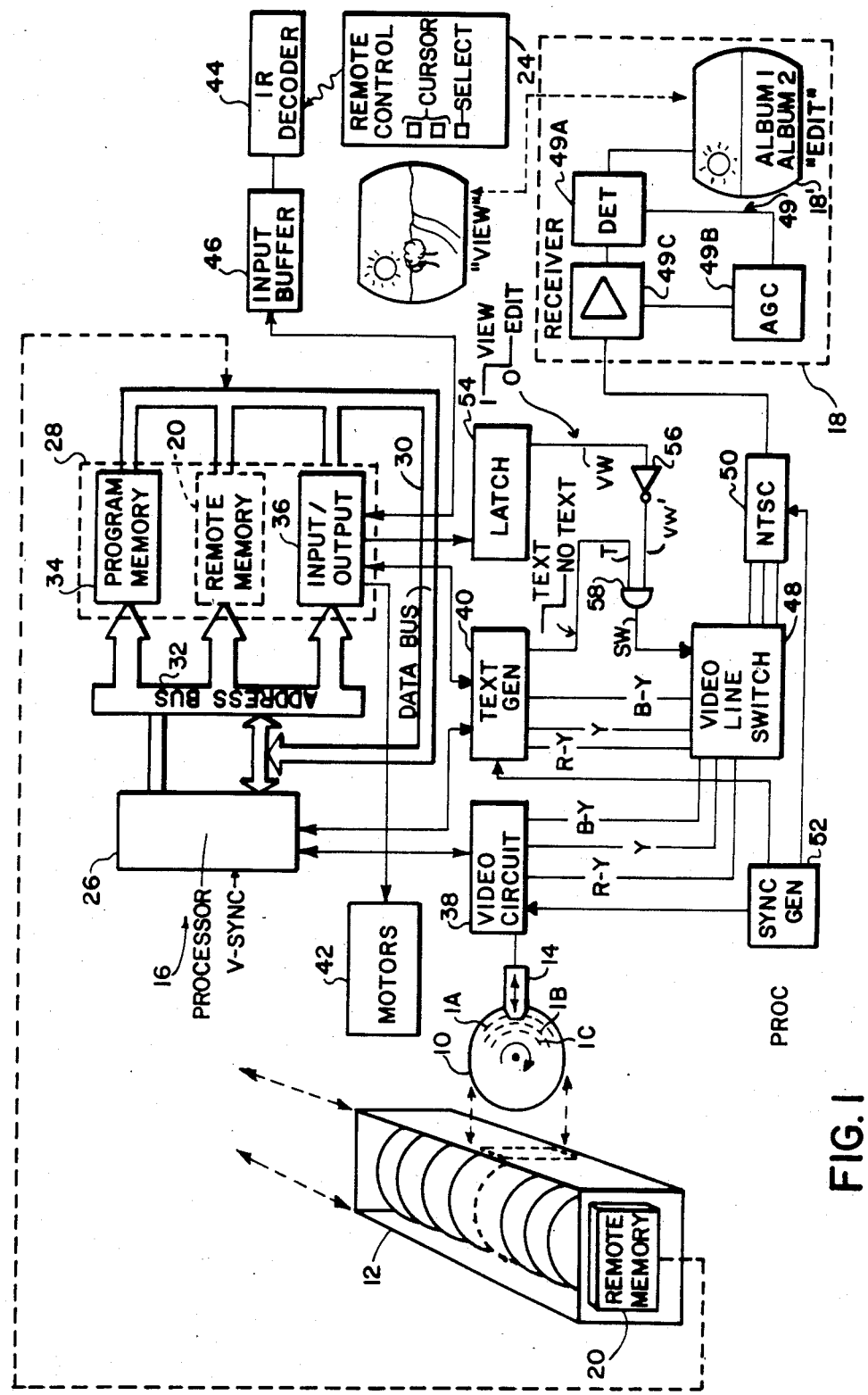
FIG. 1 is a schematic diagram of video player apparatus according to the invention.

FIG. 1 portrays a video disk player arranged according to the invention for use with a plurality of video disks organized into a video picture file. Mechanical and electrical components of such a player... which are not directly pertinent to disclosure of the present invention... are further described in related patent application (A), Serial No. 644,096. In FIG. 1, a video disk 10 has been automatically removed from a container 12 storing, say, thirty such disks. The disk may be optical or magnetic, rigid or floppy. The disk 10 has many concentric video tracks 1A, 1B, 1C..., each storing one picture. Fifty such tracks, and fifty pictures, are typically placed on the disk. A playback head 14 is seen adjacent one of these tracks. (Ordinarily the disk 10 will be contained in a protective cartridge, which is not shown here.) A player circuit 16, shown as a block diagram, reproduces each picture for display on a television receiver 18 according to a particular arrangement prescribed by the display attributes of the video picture file.

Data necessary for establishing the video picture file is contained in a remote memory 20 appended to the container 12. The remote memory 20 may be a solid state device attached to the container 12 as a separate element as shown by FIG. 1. It may also be a magnetic stripe formed on the container 12 or a removable element, say one of the disks, taken from the container 12 when it is in the player. In related patent application (A), Ser. No. 644,096, the remote memory 20 is shown as a detachable memory module containing one or more electrically-erasable programmable read-only memories (EEPROMs).

The remotely-stored data includes display attributes initially obtained by editing the pictures, that is, by assigning the pictures to one or more of, say, twenty albums or categories of like image content, by rearranging the viewing order (from the order on the disks), by skipping some pictures, by adding text to the assigned pictures, by setting individual viewing times, and so on. The viewer communicates with the player circuit 16 by observing editing "screens" produced on the television receiver 18, which provide a guide to selections, and then entering a decision via an infra-red remote controller 24. (One such screen—the "edit screen"—is shown in an abbreviated form on the display tube 18' of the television receiver 18. This and other "screens" are disclosed in detail in related patent application (B), Ser. No. 644,166.)

The video picture file data is stored in the remote memory 20 and remains there though the container 12 is removed from the player. To view an album, the container 12 is inserted into the player and the remote memory 20 is connected into the player circuit 16. An album is selected by observing album selection "screens" generated from the picture file data and pressing appropriate buttons on the controller 24. The pictures are then obtained in a rearranged order according to the particular album by accessing the disks, and the picture tracks on the disks, in a rearranged sequence—that is, a sequence unlike the order of disks, and tracks on the disks, as stored in the container 12. Viewing then proceeds automatically through the album according to the preselected display attributes with the viewer essentially unaware of the particular disks and tracks being accessed.

The player circuit 16 includes a digital processor 26 that operates by means of programs and data stored in a memory array 28. The digital processor preferably is a microcomputer, such as the 8031 microcomputer manufactured by the Intel Corporation. The 8031 microcomputer has 32 input/output (I/O) lines configured as four 8-bit parallel ports. One port connects to an 8-bit data bus 30 and provides for multiplexing both a low-order address byte and data onto the bus. The low-order address byte is latched off the data bus 30 and put on a 16-bit address bus 32. A high-order address byte is provided by another eight-bit port to the address bus 32. The memory array 28 includes a set of read-only memories (ROMs) 34 for storing the operating programs and a word library for text generation. Read and write memories include the aforementioned remote memory 20 and input/output (I/O) space 36 for memory-mapped I/O, that is, an area of memory space dedicated to memory addresses that are actually used to address peripheral devices (such as motors and sensors) and circuits. (Though not shown by FIG. 1, such peripheral devices and circuits are inter-connected with the data bus 30.) Each memory in the array 28 is connected to the address bus 32 and the data bus 30.

The processor 26 has a further port for interchanging data with a video circuit 38, which processes video data read from the video disk 10. The video circuit 38 is a conventional circuit for generating two color-difference signals R-Y and B-Y and a luminance signal Y from its input signal. The processor 26 is also connected to a text generator 40, which generates the aforementioned "screens". The digital processor 26 operates the player by coordinating signals from a variety of input sensors, including the remote controller 24 and the head 14, with commands to a variety of output devices, including the motors (shown generally by a block 42) that move the container 12 in the player, remove the disk 10, position the head 14, and rotate the disk 10. The remote controller 24 is shown with several control buttons, including a "select" button and a pair of buttons for moving a cursor. Pressing one of these buttons causes the controller 24 to generate and emit an infra-red signal that is modulated to indicate which button is being depressed. The infra-red signal is detected by an infra-red decoder 44, which has a unique decoded output corresponding to each of the controller buttons. The decoded output drives a corresponding input line of a buffer 46. The buffer 46 is addressed via memory-mapped I/O space 36, thereby asserting its input states onto the data bus 30 and to the processor 26.

The display signal to the television receiver 18 is provided by operating a video line switch 48 so as to switch between a picture signal from the video circuit 38 and a text signal from the text generator 40. According to instructions from the processor 26, the text generator 40 assembles text messages for display on the television receiver 18 as the aforementioned "screens". The text controller 40 generates color line scan signals for text and a text indicator signal T. The existence of text for all or part of a particular line of the display is indicated by the text signal T being "HIGH"; the absence of text by being "LOW". The color line scan signals are converted in a conventional matrix circuit (not shown separately) into two color-difference signals R-Y and B-Y and a luminance signal Y. The color difference and luminance signals—representative of text or background color surrounding text—are introduced to the video switch 48, which also receives picture signals from the video circuit 38. The video switch 48 can take many conventional forms. For example, it can be a configuration of single-pole double-throw switches employing bipolar or field-effect transistors for switching. It may switch within the duration of each line, for example, line-by-line, but preferably switches in ten-line groups since a text character typically occupies ten lines of video. The video switch 48 may be conditioned to switch during portions of the line period so that the display from the video picture signals will "box in" a segment of text. That is, text may be inserted in only a portion of a line with the picture on either or both sides by operating the switch more than once within the duration of a line.

The transmitted signals are applied to an NTSC generator 50, which puts out a composite video signal in NTSC format suitable for application to, and viewing on, the television receiver 18. Sync timing for the NTSC generator 50, the text generator 40 and the processor 26 comes from a sync generator 52, which in turn is locked to the incoming video signal via connection to the video circuit 38. The signal into the receiver 18 is typically processed therewithin by a conventional automatic gain control (AGC) circuit 49. A video detector 49A produces an AGC voltage proportional to the average signal level. The AGC voltage is fed back through a conventional AGC amplifier 49B to control the gain of radio frequency and intermediate frequency amplifiers 49C. The AGC circuit 49 is shown to emphasize that the average level of the signal to the display tube 18' may be influenced by the character of the incoming signal, that is, whether its line level represents picture or text. Though AGC circuits in newer receivers may lock upon sync-tip levels (keyed AGC), AGC circuits in older or misadjusted receivers may be affected by an "abnormal" line level due to text or constant-color background between and around text characters.

A switching signal SW put on an external control line of the switch 48 determines which set of video signals the switch 48 will transmit, i.e., text video or picture video signals. The switching signal SW is obtained by combining the text indicator signal T from the text generator 40 and a viewing signal VW appearing on an output line of an output latch 54. The processor 26 changes the state of the viewing signal VW when, under certain conditions that will be discussed, the person using the video player presses or releases the "select" button on the controller 24. Pressing the "select" button at such time signifies a desire to see the whole picture rather than a cropped picture combined with the text. The depressed "select" button generates a corresponding infra-red signal which is decoded by the decoder 44 and input to the processor 26 through the buffer 46. The processor 26 then puts a corresponding signal on the data bus 30 while enabling the latch 54. The latch 54 accordingly brings the viewing signal VW on its output line "HIGH". The viewing signal VW is applied to an inverter 56. The output signal VW' of the inverter 56 and the text indicator signal T are applied to the inputs of an AND gate 58, which produces at its output the switching signal SW for the video line switch 48. The switching signal SW will then remain "LOW"—causing the switch 48 to pass picture video only regardless of the state of the text indicator signal T. When the person using the video player releases the "select" button, this condition is again noted by the processor 26. The latch 54 is again enabled and the viewing signal VW on its output line is brought "LOW". After inversion, the signal VW' is "HIGH". The state of the switching signal SW will then follow the state of the text indictor signal T.

Figure 2:
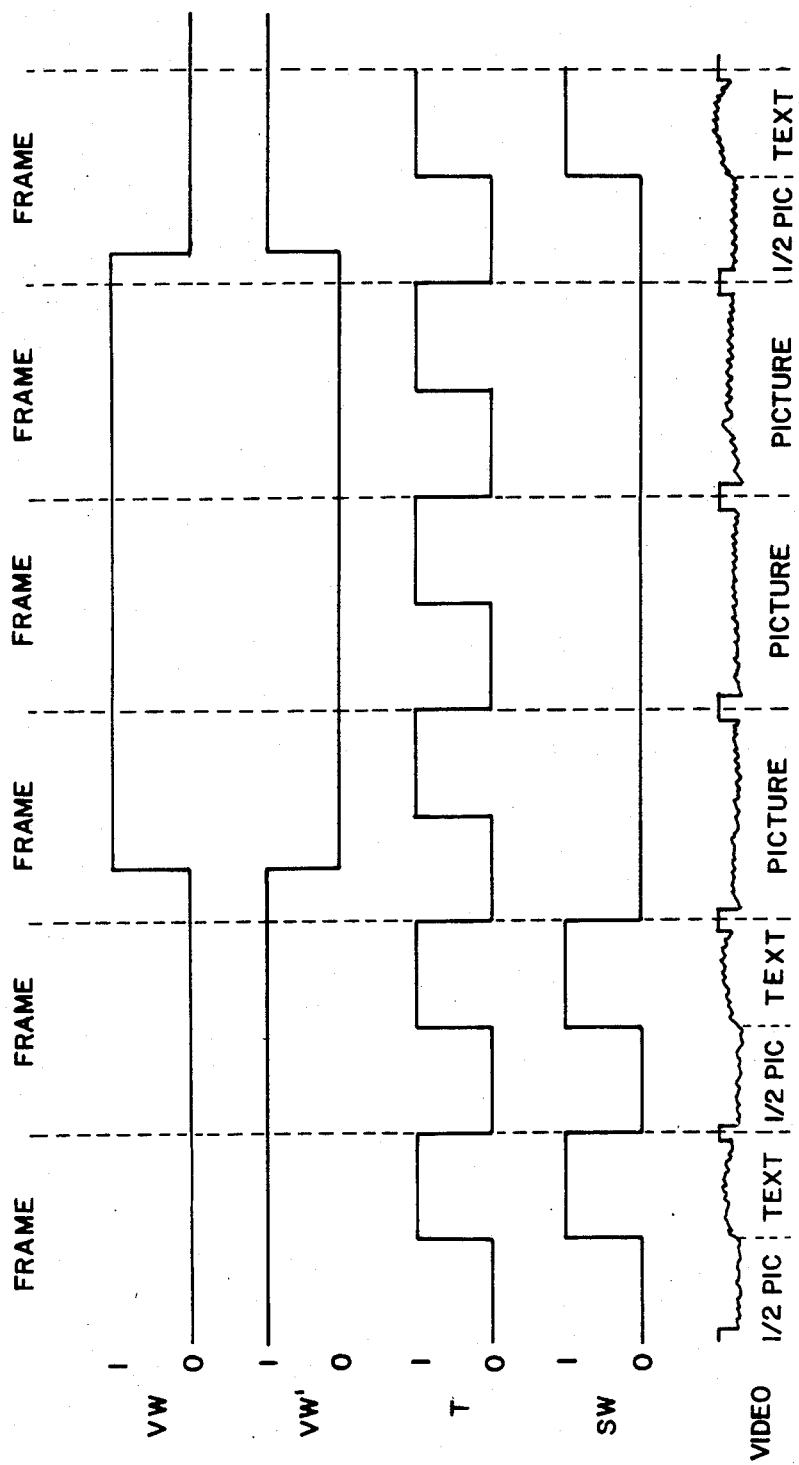
FIG. 2 is a timing diagram helpful in describing the operation of the apparatus shown by FIG. 1.

The particular relationship of the switching signal SW (and its constituent signals) to the image on the display tube 18'—either all picture or part picture and other part text—is shown by the timing diagram of FIG. 2. The video signal for each frame shows the vertical synchronization pulses and the intervening portions of text video and/or picture video (when the two parts are combined, the text is assumed for sake of discussion to cover one-half of the picture). The condition of the switching signal SW is shown over the period of each frame—"LOW" for picture and "HIGH" for text. The viewing signal VW (and its inverted counterpart VW') and the text indicator signal T are juxtaposed time-wise with the switching signal SW to show the logical relationship of these signals, as processed by the AND gate 58.

The format of an "edit screen" is shown in an abbreviated form on the face of the display tube 18' in FIG. 1. Each picture in the video picture file is produced on the display tube 18' with such an "edit screen". This "screen" shows a cropped portion of each picture and an album menu overlayed over the bottom of the picture. Due to the number of albums, the album menu may occupy as much as half or more of the face of the display tube 18'. Such an "edit screen" for twenty albums and a skip attribute is shown by the following diagram:

| | PICTURE AREA | |
| --- | --- | --- |
| *ALBUM 1 | ALBUM 9 | ALBUM 17 |
| ALBUM 2 | ALBUM 10 | ALBUM 18 |
| ALBUM 3 | ALBUM 11 | ALBUM 19 |

|  | PICTURE AREA |  |
|---|---|---|
| ALBUM 4 | ALBUM 12 | ALBUM 20 |
| ALBUM 5 | ALBUM 13 | SKIP |
| ALBUM 6 | ALBUM 14 | VIEW |
| ALBUM 7 | ALBUM 15 | EXIT |
| ALBUM 8 | ALBUM 16 |  |

The album menu at the bottom of the picture includes a list of twenty possible albums to which the picture may be assigned, as well as certain other possible actions such as "skip", "view" and "exit". A cursor is shown as an asterisk (*) and moved by pressing the cursor buttons on the remote controller 24. For a color receiver, the albums to which the picture is already assigned would be shown in a different color. A picture is filed in an album (or deleted from an already assigned album) by moving the cursor to the selected album name and pressing the "select" button on the controller 24; then the selection is stored in the remote memory 20. Additional albums are similarly selected (if desired) and the disk is stepped to the next picture by use of frame advance buttons (not shown) on the controller 24. Pressing the select button while the cursor points to "skip" enters the picture into a "skip frame" category. (Activating the "skip frame" option according to related patent application (A), Ser. No. 644,096, causes the video player to bypass any picture previously edited to "skip frame".) The "skip frame" selection is also stored in the memory 20. Pressing the "select" button while the cursor points to "view" activates the video switch 48 as heretofore discussed in connection with FIGS. 1 and 2, causing the album menu at the bottom part of the "edit screen" to be replaced with the remaining part of the picture (as characterized by the "view" screen shown on the display tube 18' in FIG. 1). The user then can see the entire picture before deciding which album(s) to put it in. Releasing the "select" button returns the album menu to the "screen". Pressing the "select" button while the cursor points to "exit" takes the user out of this part of the editing procedure. More detail on this and other "screens" and the editing procedure can be found in related patent applications (A) and (B), Ser. Nos. 644,096 and 644,166.

Figure 3:
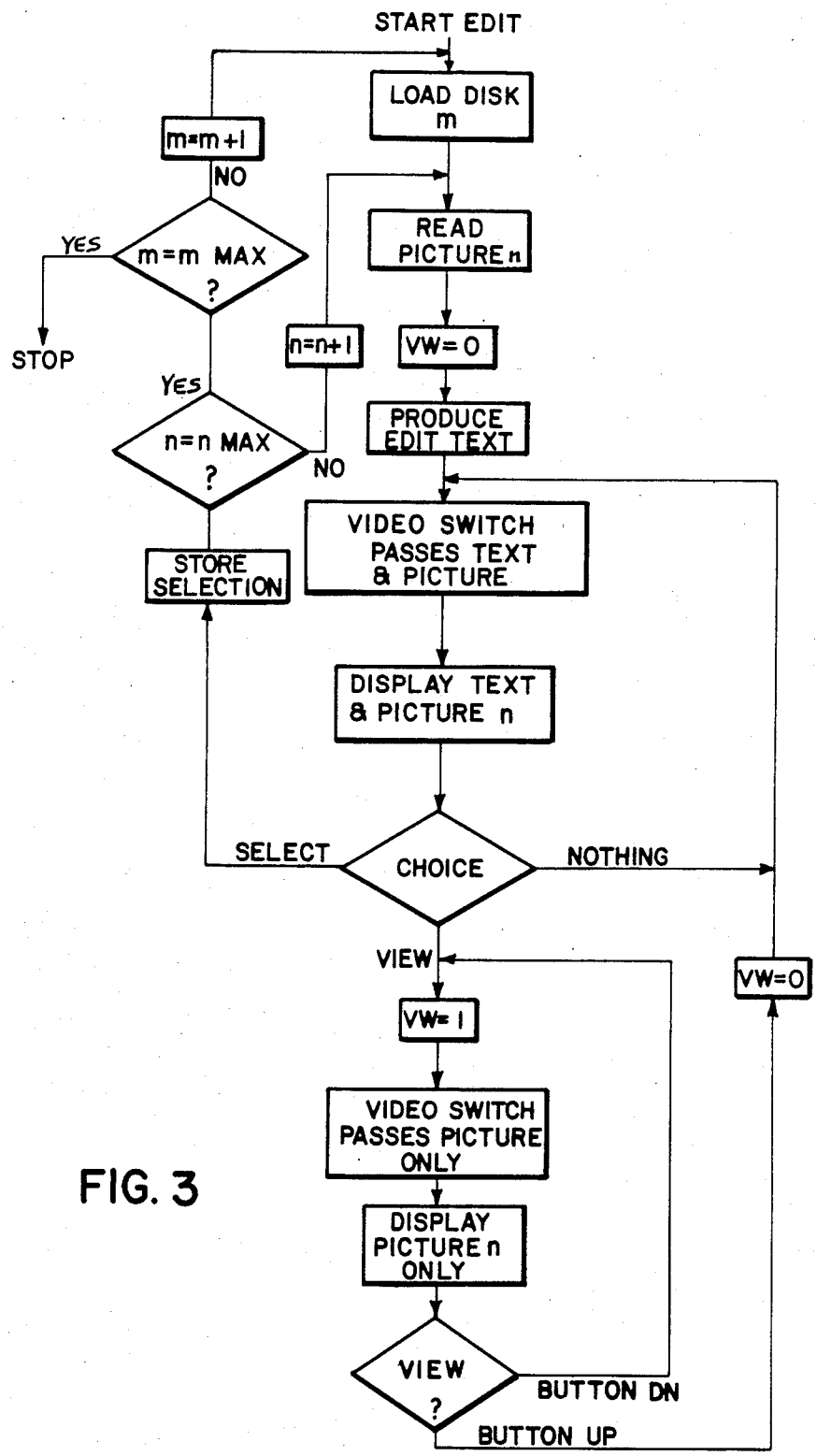
FIG. 3 is a flowchart of a procedure for operating the apparatus shown by FIG. 1 according to the invention.

FIG. 3 is a flowchart showing a procedure by which the player circuit 16 temporarily substitutes the missing part of the picture for the text in the course of using the "edit screen". A disk (denoted m) is first removed from the container 12. Then a picture (denoted n) is reproduced. The viewing signal is set "LOW", causing the video switch 48 to pass text and/or picture video according to the state of the text indicator signal T. The composite "edit screen" is displayed. The user then faces a decision. Doing nothing keeps the display as is. Making a selection loops the procedure back to the beginning, but first storing the selection in the remote memory 20 and then checking to see if the picture (n) was the last picture ($n_{max}$) and, if so, if the disk (m) was the last disk ($m_{max}$) Then, either the process stops or a new picture is displayed. (If the viewer is given the option of assigning a picture to more than one album, then the same picture is redisplayed after each selection until a frame advance button (not shown) is pressed. When the signal for frame advance appears, the above-mentioned picture checks are made and the process flow continues as shown). If the user was unable to make a selection because too much of the picture was missing, the cursor is moved adjacent "view" on the "edit screen" and the "select" button on the controller 24 is pressed. . . then the viewing signal VW is set "HIGH". The video switch 48, regardless of the condition of the text indicator signal T, passes the picture video signal only. As long as the "select" button is held down, the whole picture is displayed. When the user releases the "select" button, the viewing signal VW is set "LOW" and the "edit screen", which was continuously produced but temporarily not passed by the video switch 48, returns to the display tube 18'.

The description of the "edit screen" and of the control function represented by the "select" button, as well as the flowchart illustrated by FIG. 3, forms the basis from which a computer program can be written to operate the player circuit 16 according to the invention. A computer programmer of ordinary skill can take this material and design the appropriate program to fulfill the requirements set out therein. The statements used in the program will depend upon the approach taken by the individual programmer but the process is straightforward and conventional. It does not require experimentation in design.

The invention has been described in detail with particular references to a presently preferred embodiment thereof, but it will be understood that variations and modifications can be effected within the spirit and scope of the invention.

What is claimed is:

1. Video player apparatus for reproducing a picture from a recording medium and playing back the picture in combination with text relating to the content of the picture, said apparatus comprising:
    means for generating a video picture signal corresponding to a picture prerecorded on the recording medium;
    means for generating a video text signal corresponding to a message pertaining to the the picture and suggesting one or more decisions that may be made in relation to the picture;
    an output section for providing a signal suitable for displaying the picture with or without text;
    switching means having (A) a first state for applying said video picture signal and said video text signal to said output section thereby to display the picture including text and (B) a second state for applying only said video picture signal to said output section thereby to display the picture without text;
    controller means for selectively generating a viewing signal signifying the desire to see the picture without text; and
    means responsive to said viewing signal for placing said switching means in said second state.

2. Video player apparatus for reproducing pictures from a recording medium and playing back the pictures in combination with text relating to the content of the pictures, said apparatus comprising:
    a memory for storing data relating to the pictures;
    means for generating a video picture signal corresponding to a picture prerecorded on recording medium;
    means for generating a video text signal corresponding to a message pertaining to the the picture and suggesting alternative decisions that a user of the player may make regarding the picture;
    an output section for providing a signal suitable for displaying the picture with or without text;

video line switching means having (A) a first state for applying either said video picture signal or said video text signal to said output section within the duration of one or more lines thereby to display the picture including text and (B) a second state for applying only said video picture signal to said output section thereby to display the whole picture without text;

controller means responsive to the user for generating (A) a viewing signal signifying the desire to see the whole picture without text and (B) a selection signal signifying the decision made by the user;

means responsive to said viewing signal for placing said video line switching means in said second state in order to facilitate a decision regarding the picture; and means responsive to said selection signal for storing data representing the corresponding decision in said memory.

3. A video disk player for reproducing still pictures from one or more video disks each containing a plurality of prerecorded still pictures, said player comprising:

means for generating a video picture signal corresponding to pictures prerecorded on one of said video disks;

editing means for assigning the pictures to selected categories according to image content;

means for generating a video text signal corresponding to a message pertaining to the categories to which the pictures may be assigned;

an output section for providing a signal suitable for displaying the pictures;

switching means having (A) a first state for combining said video picture and video text signals to said output section thereby to display part of a picture and said message pertaining to the categories, and (B) a second state for applying only said video picture signal to said output section thereby to display the entire picture;

a controller with a manually-actuated switch; and means responsive to the actuation of the controller switch for putting said switching means into the second state thereby to temporarily display the other part of the picture instead of said message so as to relate the assignment of category to the entire picture.

4. A method for arranging a plurality of video pictures stored on a recording medium into a plurality of categories based on image content, said method comprising the steps of:

generating a video picture signal corresponding to the pictures stored on the medium;

generating a video text signal corresponding to a list of categories to which the pictures may be assigned;

displaying a composite picture obtained for each picture from said video text and video picture signals, said composite picture showing a cropped part of a picture, a message specifying the list of categories to which the picture may be assigned, and a movable cursor for identifying a selected category;

temporarily substituting the remaining part of the picture for the text to obtain a better indication of image content and therefore the category to which the picture should belong;

redisplaying the composite picture;

selecting one of the categories by using the movable cursor; and storing the selected category.

* * * * *